United States Patent
Berry et al.

(10) Patent No.: US 9,934,341 B2
(45) Date of Patent: *Apr. 3, 2018

(54) SIMULATION OF MODIFICATIONS TO MICROPROCESSOR DESIGN

(71) Applicant: International Business Machines Corporation, Armonk, NY (US)

(72) Inventors: Christopher J. Berry, Hudson, NY (US); Chris A. Cavitt, Poughkeepsie, NY (US); Adam P. Matheny, Beacon, NY (US); Jose L. Neves, Poughkeepsie, NY (US); Jesse P. Surprise, Highland, NY (US); Michael H. Wood, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 47 days.

This patent is subject to a terminal disclaimer.

(21) Appl. No.: 14/937,903

(22) Filed: Nov. 11, 2015

(65) Prior Publication Data

US 2017/0132340 A1    May 11, 2017

(51) Int. Cl.
*G06F 17/50* (2006.01)
*G06F 11/00* (2006.01)

(52) U.S. Cl.
CPC ...... *G06F 17/5031* (2013.01); *G06F 17/5072* (2013.01); *G06F 11/00* (2013.01); *G06F 17/5081* (2013.01)

(58) Field of Classification Search
CPC .. G06F 17/5081; G06F 17/5072; G06F 11/00; G01R 31/28

USPC ..... 716/108, 113, 134; 703/16; 714/34, 732, 714/741
See application file for complete search history.

(56) References Cited

U.S. PATENT DOCUMENTS

| | | | | |
|---|---|---|---|---|
| 4,130,794 A | * | 12/1978 | Cox | G01R 31/023 324/538 |
| 4,218,745 A | * | 8/1980 | Perkins | G01R 31/021 29/705 |
| 4,743,887 A | * | 5/1988 | Pothier | G01R 31/2822 324/510 |
| 5,095,454 A | * | 3/1992 | Huang | G01R 31/3016 703/19 |
| 5,414,715 A | * | 5/1995 | Hamblin | G01R 31/2812 714/724 |

(Continued)

FOREIGN PATENT DOCUMENTS

| | | | | |
|---|---|---|---|---|
| EP | 2154621 A1 | 2/2010 | | |
| JP | 2006189340 A | * 7/2006 | | G01R 31/26 |

OTHER PUBLICATIONS

Wikipedia, Electronic Circuit Simulation, https://en.wikipedia.org/wiki/Electronic_circuit_simulation, last edited on Jun. 2, 2017, printed on Aug. 24, 2017, pp. 1-3.*

(Continued)

*Primary Examiner* — Phallaka Kik
(74) *Attorney, Agent, or Firm* — Peter J. Edwards

(57) ABSTRACT

A first open path in a microprocessor design is identified. At least one modification to a design of that first open path is simulated. An updated arrival time at a pin is calculated based on the simulated modification or modifications. An updated path time is then calculated based on the updated arrival time.

10 Claims, 8 Drawing Sheets

(56) References Cited

U.S. PATENT DOCUMENTS

| | | | |
|---|---|---|---|
| 5,420,512 A * | 5/1995 | Spillane | G01R 31/021 324/539 |
| 5,461,576 A | 10/1995 | Tsay et al. | |
| 5,736,862 A * | 4/1998 | Hamblin | G01R 31/046 324/527 |
| 5,764,525 A * | 6/1998 | Mahmood | G06F 17/5045 716/104 |
| 6,591,407 B1 * | 7/2003 | Kaufman | G06F 17/505 716/114 |
| 7,143,367 B2 | 11/2006 | Eng | |
| 7,187,179 B1 * | 3/2007 | Scaman | G01R 31/2884 257/18 |
| 7,290,232 B1 * | 10/2007 | Fung | G06F 17/5031 716/113 |
| 7,337,100 B1 | 2/2008 | Hutton et al. | |
| 7,441,211 B1 * | 10/2008 | Gupta | G06F 17/5063 716/113 |
| 8,028,260 B1 | 9/2011 | Ravi | |
| 8,138,786 B2 | 3/2012 | Lewis et al. | |
| 8,572,532 B1 | 10/2013 | Singh et al. | |
| 8,612,916 B1 | 12/2013 | O'Higgins et al. | |
| 8,904,334 B2 | 12/2014 | Turner, Jr. et al. | |
| 2001/0047507 A1 * | 11/2001 | Pileggi | G06F 17/5072 716/123 |
| 2002/0011827 A1 * | 1/2002 | Ishida | G01R 31/318342 324/71.5 |
| 2002/0083398 A1 * | 6/2002 | Takeyama | G06F 17/5045 716/102 |
| 2002/0113598 A1 * | 8/2002 | Tsuji | G01R 31/309 324/501 |
| 2003/0016044 A1 * | 1/2003 | Ishida | G01R 31/3181 324/762.02 |
| 2003/0212972 A1 | 11/2003 | Tran | |
| 2004/0163023 A1 * | 8/2004 | Ishida | G01R 31/3181 714/738 |
| 2004/0243964 A1 * | 12/2004 | McElvain | G06F 17/5031 716/112 |
| 2006/0061368 A1 * | 3/2006 | Furse | G01R 31/11 324/519 |
| 2006/0117276 A1 * | 6/2006 | Nishiwaki | G06F 17/5068 716/112 |
| 2006/0200786 A1 * | 9/2006 | Chang | G06F 17/5022 716/108 |
| 2006/0248485 A1 * | 11/2006 | Foreman | G06F 17/5031 716/113 |
| 2007/0016881 A1 * | 1/2007 | Gregory | G06F 17/5031 716/108 |
| 2008/0036486 A1 * | 2/2008 | Gattiker | G01R 31/2879 324/762.09 |
| 2008/0191704 A1 * | 8/2008 | Gholami | G01R 31/2853 324/527 |
| 2009/0037852 A1 * | 2/2009 | Kobayashi | G06F 17/5081 716/132 |
| 2009/0112557 A1 * | 4/2009 | King | G06F 17/5031 703/15 |
| 2009/0125858 A1 | 5/2009 | Vishweshwara et al. | |
| 2010/0095259 A1 * | 4/2010 | Tetelbaum | G06F 17/5031 716/113 |
| 2010/0262941 A1 * | 10/2010 | Fry | G06F 17/5045 716/134 |
| 2010/0268522 A1 * | 10/2010 | Bhanji | G06F 17/5031 703/21 |
| 2012/0144358 A1 * | 6/2012 | Alpert | G06F 17/5077 716/113 |
| 2012/0185810 A1 | 7/2012 | Borkam et al. | |
| 2012/0218005 A1 * | 8/2012 | Chua-Eoan | G06F 1/26 327/107 |
| 2012/0313254 A1 * | 12/2012 | Rowhani | H01L 23/522 257/774 |
| 2012/0324412 A1 * | 12/2012 | Tirumala | G06F 17/5031 716/114 |
| 2013/0214807 A1 * | 8/2013 | Okamoto | G01R 31/318577 324/750.01 |
| 2013/0346937 A1 * | 12/2013 | Kennedy | G06F 17/5081 716/122 |
| 2014/0059507 A1 * | 2/2014 | Sunter | G06F 17/5009 716/112 |
| 2015/0199468 A1 * | 7/2015 | Priel | G06F 17/5081 716/113 |
| 2015/0248512 A1 * | 9/2015 | Shen | G06F 17/5054 716/113 |
| 2016/0012172 A1 * | 1/2016 | Folberth | G06F 17/5081 716/113 |
| 2016/0109511 A1 * | 4/2016 | Kuo | G01R 31/2884 324/750.3 |
| 2017/0045576 A1 * | 2/2017 | Balasubramanian | G01R 31/2882 |

OTHER PUBLICATIONS

Liu et al., "On Logic Synthesis for Timing Speculation," IEEE/ACM International Conference on Computer-Aided Design, Nov. 5-8, 2012, pp. 591-596, San Jose, CA, Copyright 2012 ACM.

Berry et al., "Simulation of Modifications to Microprocessor Design", U.S. Appl. No. 15/135,595, filed Apr. 22, 2016.

List of IBM Patents or Patent Applications Treated as Related, dated Apr. 20, 2016, 2 pages.

* cited by examiner

400

SIMULATION OF MODIFICATIONS TO MICROPROCESSOR DESIGN

BACKGROUND

The present disclosure relates to microprocessor design, and, more specifically, to computer systems that facilitate the process of refining designs of microprocessors.

Microprocessor design typically involves the design of logic macros and integration components that link the logic macros together. Logic and integration designs are co-dependent; an error in either could negatively affect the timing of the other and all downstream components. Designers typically attempt to eliminate these negative timing effects in lengthy trial-and-error processes of combining logic and integration within the chip.

SUMMARY

Some embodiments of the disclosure can be illustrated by a method, system, or computer program product. In the method, system, or computer program product, a first open path in a microprocessor design may be identified. At least one modification to a design of the first open path may then be simulated. An updated arrival time at a pin may be calculated based on the simulated modification or modifications. An updated path time may then be calculated based on the updated arrival time.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
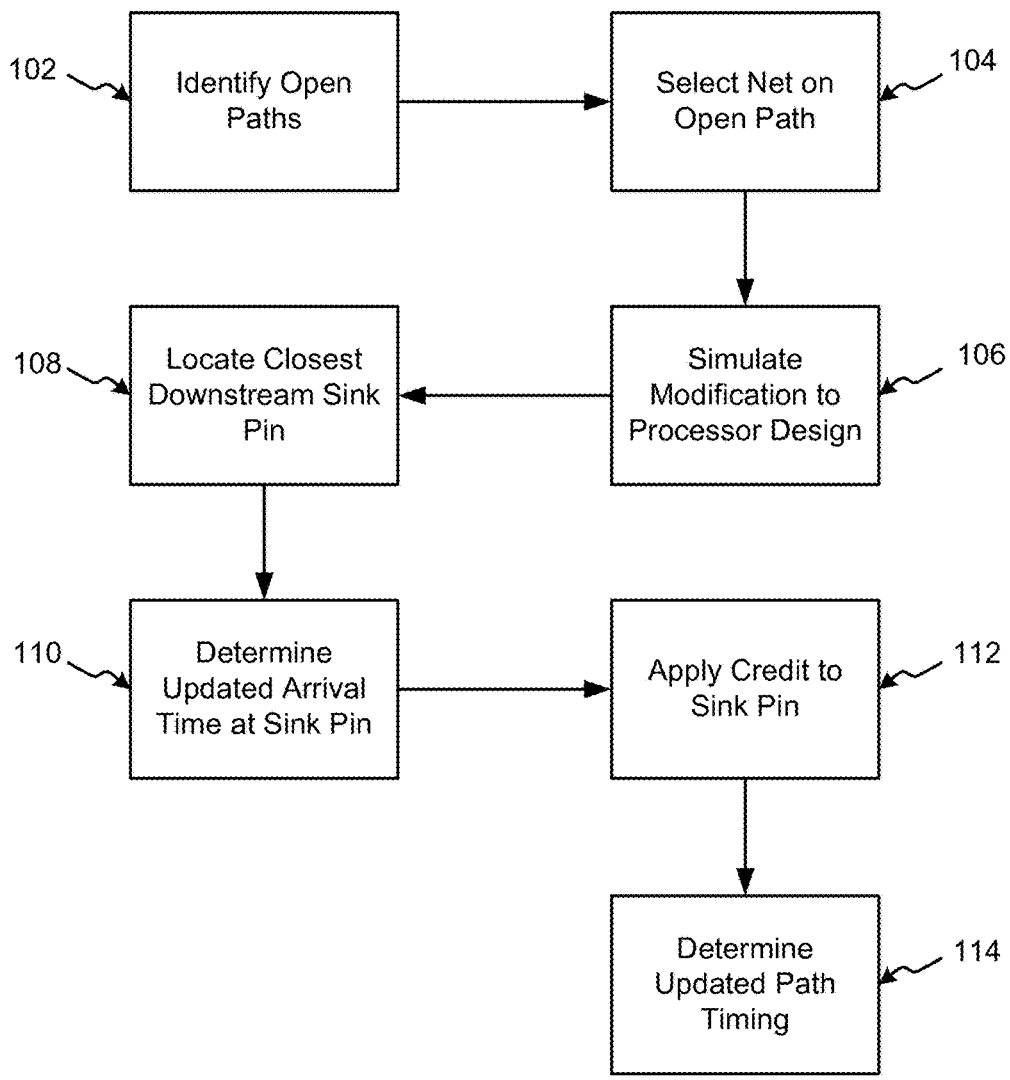
FIG. 1 depicts a logic-flow diagram illustrating a method of simulating integration modifications on an open microprocessor path, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure relates to microprocessor design, and, more specifically, to computer systems that facilitate the process of refining designs of microprocessors. While the present disclosure is not necessarily limited to such applications, various aspects of the disclosure may be appreciated through a discussion of various examples using this context.

Microprocessor design typically involves the contemporaneous design of multiple paths of logic and integration. "Logic" portions of a path in microprocessor design generally refer to long strings of arithmetical/logical operations of a microprocessor that make up the complex macros of the microprocessor design. "Integration" portions of a path, on the other hand, generally refer to the lengths of nets, pins, and repeaters (as used herein, a repeater may be an inverter or a series of inverters) that connect these macros to one another throughout the processor chip. The microarchitecture of these paths or of sections of an individual path may be created by separate engineers, leading to differences in the implementation of design on each path. As these sections of paths, also referred to as "nets," are designed, they are typically combined together to form complete paths.

A net is a section of a path for which the function of the path is not changed throughout the section. A net may either refer to a logical net or a physical net. A physical net is a conductor that connects two or more components together. Typically, this takes the form of a wire connecting a source component, such as a pin or repeater, to one or more sink components, such as a second pin or repeater. A logical net, on the other hand, may be a physical net or a series of physical nets. The series of physical nets in a logical net are typically connected by repeaters. As used herein, the term "net" refers, unless otherwise noted, to a logical net that may be composed of either a single physical net or a series of physical nets. A net may begin at a single source component (such as a pin or repeater) and end at a single sink component, or may end at two or more sink components. However, a net will typically only have a single source component, as combining multiple source components (e.g., two sections of a path converging at an AND gate) may change the function of the net. While nets typically begin at a source terminal and terminate at one or more sink terminals, they may sometimes be considered as any length of conductor that spans between two points on a path.

One method by which a microprocessor design is assessed is timing analysis. In timing analysis, an electrical signal is simulated over a microprocessor path design to determine the amount of time it would take for such a signal to travel from one point of the path (an "upstream" point) to another (a "downstream" point). Such amounts of time are referred to as "times of flight." Typically, the upstream point is the beginning of the path and the downstream point is the end of the path. However, timing may be performed on multiple paths that are arranged in a series, or on a portion of a singular path. When performing timing analysis, it may be required for the electrical signal to travel from the upstream point to the downstream point in a predetermined amount of time (the "required time"). When timing over an entire path, for example, typically it is required that the signal travel from the upstream point to the downstream point in the amount of time that the microprocessor would complete one clock cycle. However, other amounts of time may be used. Some paths, for example, may have a required time (also referred to as the "required path time") of less than one cycle if they perform particularly simple instructions. Some paths, on the other hand, may be executed when a clock pulse or multiple clock pulses are suppressed, in which case the required time may be longer.

In timing analysis, the time at which an electrical signal would arrive at any given point on a path is referred to as the arrival time for that point. Each point on a path typically has its own arrival time, with the arrival times of more downstream points being larger (i.e., later in time) than the arrival times of upstream points. Similarly, each point in a path may be said to have a required time as well, distinct from the required time of the entire path. Required times of downstream points are typically larger than required times of upstream points (while this may not be true, for example, in some designs in which one source wire branches into multiple downstream paths with different required path times, it is to be assumed in this disclosure, for the sake of simplicity, that downstream points have larger required times than upstream points). The required time at the most downstream point on a path (a sink pin, for example) is the required path time, which will typically be equal to a clock cycle. The required time of upstream points is typically equal to the required time of the nearest downstream point minus the time of flight between the upstream point of interest and the nearest downstream point. For example, the required time for the second-most downstream point on a path (e.g., a signal repeater) is typically the required path time minus the time of flight between the second-most downstream point and the most downstream point (e.g., from that signal repeater to the sink pin of the previous example). Further, the required time of the third-most downstream point (e.g., a signal inverter) is typically the required time of the second-most downstream point minus the time of flight between the third-most downstream point to the second-most downstream point (e.g., from that signal inverter to the signal repeater of the previous example). Note that where one upstream point has multiple downstream points (e.g., where one path branches off into multiple downstream paths), the smallest downstream required time is used to calculate the required time at that upstream point.

Any path for which the arrival time at the most downstream point is equal to or lower than the required path time is said to be a closed path. On the other hand, any path for which the arrival time at the most downstream sink pin is greater than the required path time is said to be an open (i.e., failing) path. If the arrival time at any given point on a path is less than the required time at that point in the path, that point is said to have positive slack. If the arrival time at any given point on a path is greater than the required time at that point on the path, that point is said to have negative slack. The amount of slack at any point on a path represents the amount of redesign at or before that point that may help close the path. If a point exhibits a large amount of negative slack, a signal travelling through the path would likely arrive at that point far after the required time, and that point (or any point before it) may cause the path to fail.

In some embodiments a path may be open because signals moving across the path take a long time to traverse a pin on that path. When a signal arrives at and travels over a pin, a voltage change occurs at the pin (either rising from a low voltage to a high voltage or falling from a high voltage to a low voltage) before the signal leaves the pin. The rate of that change in voltage is referred to as the slew rate, and may have significant impacts on path timing. If the pin has a high slew rate, it will have a short rise/fall time and thus a signal will traverse the pin and proceed to the downstream portions of the path quickly. If the pin has a low slew rate, however, the pin will have a long rise/fall time, and thus a signal will take a long time to traverse the pin. This may cause a large delay over the entire path. Typically this rise/fall time is measured from the point at which the signal has risen or fallen 10 percent past the low or high voltage (i.e., the rise/fall time occurs between 10 percent voltage and 90 percent voltage). Further, the arrival time at a pin is typically considered to occur at the point at which the signal has risen or fallen 50 percent past the low or high voltage.

During the microprocessor design process, differences in implementation for different nets on a path may cause significant timing mismatches between nets. Further, timing mismatches may be exacerbated if multiple nets in a path are designed to be located on different wiring layers of a microprocessor. These timing mismatches often cause paths to take far longer to complete than they would have taken had the timing of each net been optimized in relation to the path. This extensive suboptimal timing often leads to a high number of open paths early in the design process.

Timing issues on open paths are typically addressed by trial-and-error integration modifications on each net. These trial-and-error processes involve time-consuming changes to the integration solution (the collective integration design for the entire path or net). Path timing is retested after each integration-design modification. If a path is not closed, further integration modifications are often attempted. In addition to being time consuming, these integration modifications may prevent other work on the path while the modification is being designed and implemented into the timing analysis software. If, for example, modifications to logic are necessary in order to close a path, design for those modifications may not start until after all known modifications to the integration solution have been implemented but have failed to close a path. Attempting all integration modifications may take several weeks or longer, and thus paths that are open due to logic problems may remain in integration redesign for a significant period of time before the logic problems begin to be addressed.

While integration modifications may take weeks to troubleshoot, they are typically attempted before logic modifications in microprocessor design because logic modifications typically take far longer to design. However, logic problems are often considered to be more critical than integration problems. Further, modifications to logic may require consequential changes to the integration solution, potentially causing the integration modifications that were pursued prior to the logic-design modifications to be obsolete. This may create a need for a system that identifies logic problems and enables the pursuit of solutions to those logic problems earlier in the design process.

In some embodiments of the present disclosure, modifications to the integration solution of a processor design are simulated in the early stages of the overall design process.

In some embodiments these modifications may be simulated when parent timing analysis is first performed and open paths are identified. Simulation software may be configured to simulate an ideal integration solution within the constraints of the current logic design, or may be configured to simulate select identified modifications that may potentially improve path timing.

Some embodiments may bypass the steps of designing and implementing integration improvements by simulating the estimated timing improvement that would result from a successful modification to a suspected integration inefficiency. These simulated timing improvements typically take the form of a changed arrival time at a downstream point on the net, usually a sink pin. Once an updated arrival time is determined, the updated arrival time may be stipulated (i.e., accepted as true) in the process that determines the timing for the entire path. With this stipulation, the timing of the entire path that would result from the integration modification may be calculated. If the updated path timing suggests that the path would remain open, it would be likely that the estimated modification would not be sufficient to close the path. If the estimated modification represented an ideal integration solution, it would be likely that no integration modifications would close the path, and that logic modifications should be pursued.

FIG. 1 illustrates a logic-flow diagram of a method 100 of simulating integration modifications on an open microprocessor-design path to determine whether logic improvements are required to close the path. In block 102, open paths in the microprocessor design are identified. This may be performed by a physical processor operating within a computer (herein referred to as "processor") that is configured to perform a microprocessor-design timing process by, for example, simulating a signal propagating through a single microprocessor-design path or through multiple paths in a microprocessor design. In this example, the time between the signal leaving the original source pin on the path and arriving at the last sink pin in the path must be shorter than the associated rise and fall of the processor-design clock (herein referred to as the "required time"). The processor may be configured to then identify the paths for which the signal did not reach the last sink pin in the required time (open paths) by any means known in the art (e.g., sorting the open paths into a list or presenting a list of all paths with open paths differentiated by color, font, or others).

In block 104, the processor may automatically select a net on an open path, or may be prompted by a user to select a particular net. The selected net may be bounded by a source pin and sink pin. This source pin may be any pin in the path, but will oftentimes be the pin at the exit of a logic macro. The sink pin may be any pin downstream of the source pin, but will oftentimes be a pin at the entrance to a downstream logic macro or hierarchal junction. The processor may then be configured to simulate a modification to the microprocessor design on the path in block 106. This modification may be, for example, a modification of the integration distance between the source and sink pins (shown in more detail in FIGS. 2 and 3), a modification to the position of a hierarchal pin on the net (shown in more detail in FIGS. 4 and 5), or any modification or combination of modifications for the purpose of decreasing the rise time or fall time (collectively or alternatively referred to as the rise/fall time) at a pin on the net (shown in more detail in FIGS. 6 and 7). In these embodiments the act of simulating a modification would not involve the associated work or time of designing the modification or implementing the modification in microprocessor-design software. For example, the processor may simulate the design modification as part of a query system. A user may query the processor to determine what the result, typically in terms of arrival time at a downstream pin, would be if, for example, a rise time of a certain magnitude were present at a pin on the path. The result would be simulated, but the modification or combination of modifications necessary to achieve this rise time may not be determined.

In some embodiments the processor may simulate the result by locating the closest downstream sink pin from the position of the simulated modification (e.g., the point on the net to which a hierarchal pin was relocated) in block 108, and in block 110 may estimate what the arrival time of the signal (as simulated by the same processor associated with block 102) would have been at that sink pin had the modification been incorporated into the design. In other embodiments other downstream sink pins on the path may be selected in block 108. Typically a voltage change is triggered at a pin when a signal arrives at the pin. In some embodiments, the fifty-percent completion point of this voltage change may be considered to be the arrival time at that pin. However, in other embodiments other metrics may be used to calculate the arrival time.

The updated arrival time estimated in block 110 may be compared with the arrival time at that pin without the simulated modification. In most instances the updated arrival time will be smaller than the previous arrival time, so this comparison will result in a negative "credit" that represents the processor's estimation of how much faster a signal would arrive at the selected pin with the simulated modification. The credit may be applied to the sink pin in block 112 by, for example, stipulating in the processor-design timing process that the simulated signal actually arrived at the selected pin at the updated arrival time from block 110. After applying the timing credit, an updated path time may be calculated in block 114 with the simulated modification taken into account.

The updated path timing results may be useful for several purposes, depending on the embodiment. In some embodiments the updated path time may be compared to the required time in order to determine whether the simulated integration modification would be sufficient to close the path. For example, in embodiments in which designing and implementing a particular modification appears as if it would be faster than others (for instance, if it would be a simple redesign to add a driver before a pin to improve the rise/fall time at the pin), simulating solely that particular modification with method 100 would aid microprocessor-design engineers in determining whether to rely solely on pursuing the design of that modification in an effort to close the path. In some embodiments, on the other hand, method 100 may be used to determine whether logic design work is likely to be necessary to close a path; if method 100 were used to simulate a perfect integration solution and the path remained open, designers would know that integration modifications alone would be unable to close the path and that logic work would be necessary. In other embodiments method 100 may be used on multiple paths to rank the paths based on the amount of remaining negative slack after simulated modifications are taken into account. Paths with more remaining negative slack typically are open by a larger magnitude, and thus are deemed more critical to fix. Thus, ranking the paths based on the amount of remaining negative slack may, in some embodiments, also be termed ranking the paths based on their criticality.

In one embodiment, method 100 may performed on ten open paths to simulate a perfect integration solution on each path. In this embodiment three paths may remain open and seven paths may be closed if a perfect integration solution is simulated. The three open paths may be termed Paths A, B, and C. Path A may remain open by 60 picoseconds (ps), Path B may remain open by 7 ps, and Path C may remain open by 450 ps. In this embodiment designers may rank Path C as the most critical path, Path A as the second-most critical, and Path B as the least-critical open path. Further, because a perfect integration solution had been simulated on the paths, it would be apparent that integration design modifications would not be sufficient to close the three paths, and that logic design modifications would be necessary. Because Path C is ranked the most critical path in this example, designers working on these paths would know to work on Path C before Path A or Path B, as Path C would be likely to require the most design work.

In some embodiments, method 100 may simulate a modification to the integration distance between two points on a path. In most embodiments wires in a processor design only travel at right angles, and thus a modification to the integration distance in those embodiments would be constrained by rectilinear distance, also known as Manhattan Distance. In other words, in an X-Y coordinate system in which connected line segments represent the wire on a path, if the X value were to differ at different points on a line segment, the Y value would be constant at all points on that line segment. In some embodiments simulating a modification to integration distance may take the form of minimizing the Manhattan Distance between a source pin and a downstream sink pin. Minimizing the distance between pins represents an integration solution without any scenic integration. Scenic integration, as used herein, refers to a path or portion thereof that is laid out in a more circuitous route than is necessary to connect the beginning and the end of that path or portion thereof.

Minimum Manhattan Distance may be identified by, for example, determining the Cartesian coordinates of the source and sink pin and determining the difference in absolute values of the X coordinates, determining the difference in absolute values of the Y coordinates, and combining the differences into one value. For example, if a source pin were located at X=10 Y=40 and a sink pin were located at X=4 Y=100, the absolute difference in X would be 6 and the absolute difference in Y would be 60, so the minimum Manhattan Distance between the pins would be 66.

Figure 2:
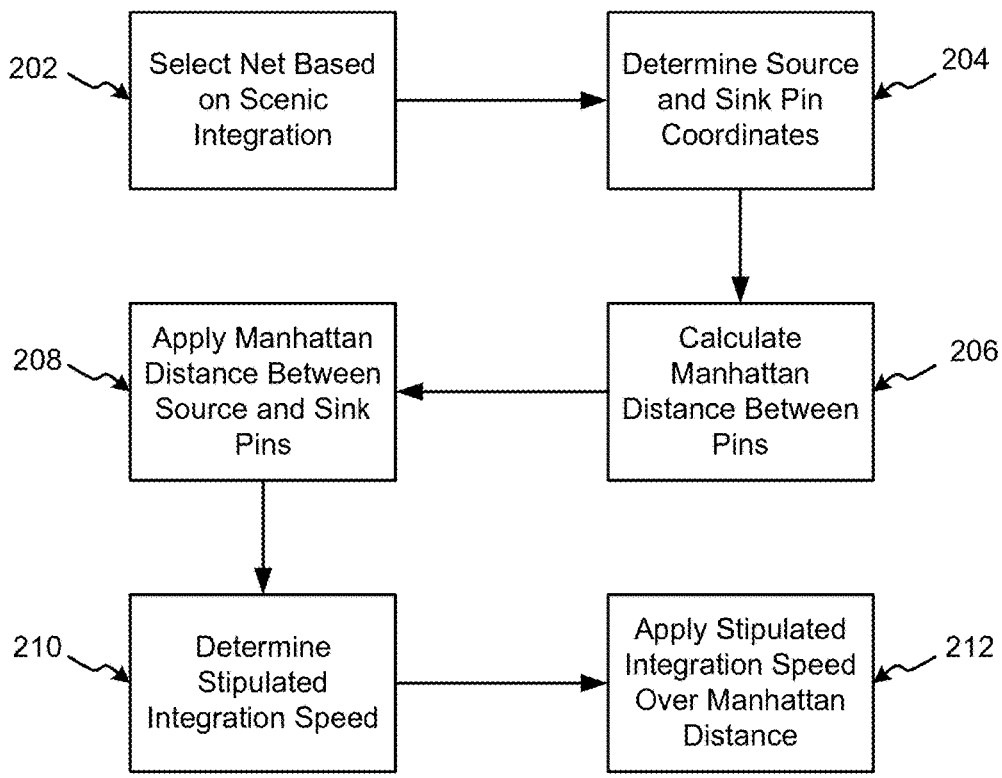
FIG. 2 depicts a logic-flow diagram illustrating a method for simulating a modification to the integration distance between two pins, in accordance with embodiments of the present disclosure.

FIG. 2 illustrates a logic-flow diagram of a method 200 for simulating a modification to the integration distance between two pins. In block 202, a net on which to simulate the modification is selected based on the potential for scenic integration on the net. In some embodiments the selected net may constitute a small portion of the path, whereas in other embodiments the net may span the entire path. Further, while in some instances this net may be selected due to a well-founded conclusion that the net exhibits scenic integration, in other embodiments the net may be selected on an uninformed assumption that scenic integration may be contributing to the path's open state.

As discussed, the modification of the integration distance may be simulated between two pins, e.g., a source and sink pin. In block 204, the Cartesian coordinates of the source and sink pins are determined. In block 206, these coordinates are used to determine the Manhattan Distance between the pins. Typically the shortest Manhattan Distance between the two pins will be used, i.e., the sums of the absolute values of the differences between the Cartesian coordinates. However, other distances may be used for example, if some redesign work to reduce the integration distance has already been considered and designers wish to simulate the estimated results of the specific design modifications being considered in order to determine whether the modifications would close the path. In other embodiments this method may be used to simulate an increase to the integration distance. This may be beneficial if a highly critical path could be shortened by making use of a pin that is currently on a different, closed path. The different path may then be required to be designed around the pin and routed to a different pin, increasing the integration distance. This method may be used to determine if that different path would be open after the modification increasing its integration distance.

The simulated integration distance may be stipulated between the source and sink pins, such as in method 100, to an updated arrival time of a signal at the sink pin or another downstream pin based on the stipulated distance. In some cases this may require also stipulating a speed at which the signal is to move through the wire and repeaters (i.e., the integration speed) over that Manhattan Distance. In block 210 this stipulated integration speed is determined, typically based on an average of the speed at which a signal would travel through the wire and the speed at which a signal would travel through the repeaters over the distance, weighted according to the length of wire and number and size of repeaters. In some embodiments ideal integration speeds are used. Ideal integration speeds may be based on the presumptions that a sufficient number and strength of repeaters is present to prevent drive-strength related delays but also that excess number or strength of repeaters and related delays are not lowering integration speed. In some other embodiments integration speeds that are less than ideal but that may be more feasible, given the path restraints, may be used. In block 212, the integration speed is applied to the Manhattan Distance, which may then be used in method 100 to calculate an updated arrival time of a signal at a downstream pin.

Figure 3:
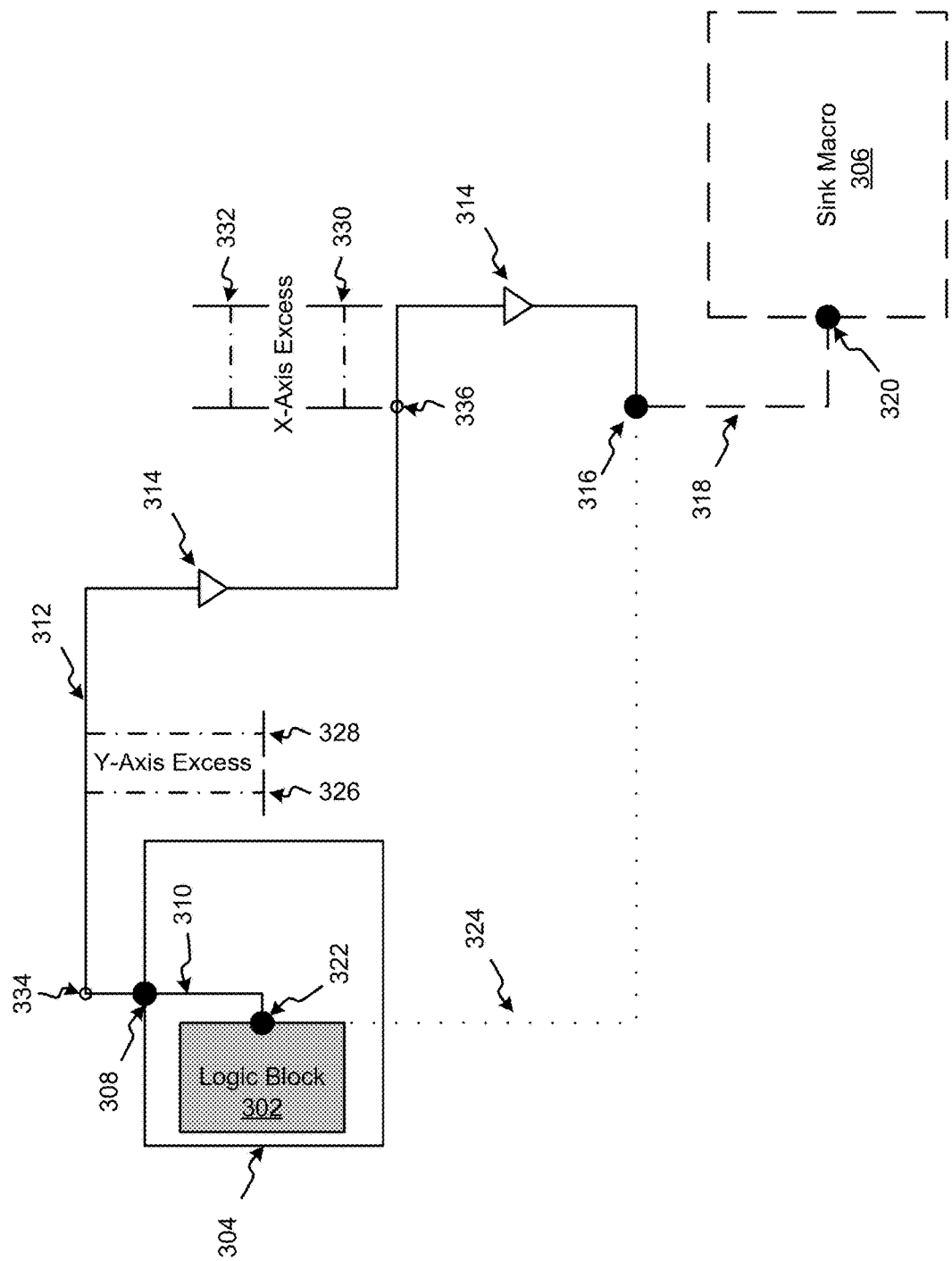
FIG. 3 illustrates a simplified representation microprocessor design for which a modification to the integration distance between two pins may be simulated, in accordance with embodiments of the present disclosure.

FIG. 3 provides an example of a path design for which method 200 may be performed. The path proceeds from Logic Block 302 in Source Macro 304 to Sink Macro 306. A signal on the path would leave Logic Block 302, from Logic Pin 322, and travel to Source Pin 308 through Macro Wire 310. After passing through Source Pin 308, the signal would travel along Integration Wire 312, with Repeaters 314 increasing the drive strength of the signal. The signal passes through Hierarchal Pin 316, along Parent Integration Wire 318, and completes the path at Sink Pin 320.

Applying method 200 to FIG. 3, Logic Pin 322 may be treated as the source pin and Hierarchal Pin 316 may be treated as the sink pin. Calculating the minimum Manhattan Distance between these two points would give the shortest distance possible in a microprocessor design limited to right-angle travel. This Manhattan Distance is represented by dotted Path Simulation 324, composed of two line segments. While the same distance would be exhibited by any number of rectilinear line segments between these two points provided the segments never moved away from Hierarchal Pin 316 (i.e., the wire never back tracked), a minimum amount of wire segments is provided here for clarity. Note that in instances in which two points differ in only one dimension (e.g., only in the X axis), only one line segment would be necessary.

By simulating a modification that achieves minimum integration distance, potential scenic routes in the current integration solution may be eliminated from path timing. For example, Y-Axis Excess 326 represents the amount that travelling from Logic Pin 322 through Source Pin 308 and to Reference Point 334 increases the total path distance. Y-Axis Excess 328 represents the same distance, but travelling back down to the Y-axis level at which Logic Pin 322 is located. Similarly, X-Axis Excesses 330 and 332 represent the amount that travelling past Reference Point 336 on the X axis and back to Hierarchal Pin 316 increases the total path distance.

In this embodiment simulating a modification that eliminates these excesses does not provide the integration design to incorporate the modification, but instead simulates what would happen if the modification were designed and implemented, by stipulating the estimated result of the modification. In order to estimate a result for the simulated modification, a new integration speed may be calculated. In some embodiments this may be performed by determining the ideal integration speed of the wire and repeaters throughout portion of the path. This ideal wire speed is the speed at which a signal would travel if an optimal number and size of repeaters were present throughout the wire. In other embodiments, a slower integration speed may be used in order to, for example, estimate an imperfect repeater solution or estimate a deliberate reduction in drive strength throughout the wire. With the simulated integration distance between Logic Pin 322 and Hierarchal Pin 316 and the simulated integration speed over that distance, a time of flight between Logic Pin 322 and Hierarchal Pin 316 may be estimated. That estimated time of flight may be converted to an estimated arrival time at Hierarchal Pin 316, which may then be stipulated into a microprocessor-design timing process, as discussed in accordance with FIG. 1.

In some embodiments method 100 may simulate a modification to the position of a hierarchal pin on a path. If the hierarchal pin were the point of transfer from a slower layer to a faster layer, simulating moving the pin to different positions on the path would enable designers to simulate the timing consequences of differing amounts of the path travelling over that faster layer. For example, if an open path were to have a hierarchal pin from a slower to a faster layer precisely at the path's midpoint, moving the hierarchal pin to an earlier point in the path (e.g., to one quarter of the way through the path) would alter the percentage of the path that is on the faster layer. In this example, the percentage would change from fifty percent to seventy-five percent, and the path would be faster as a result.

Figure 4:
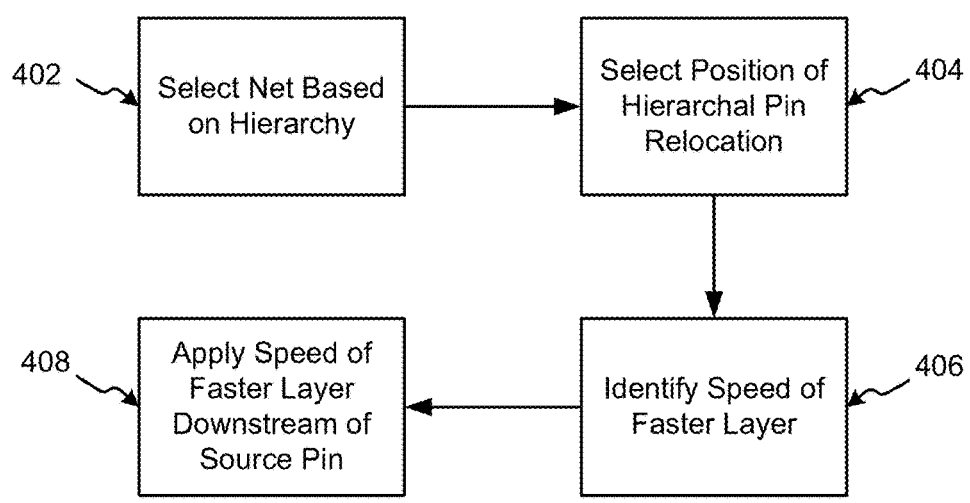
FIG. 4 depicts a logic-flow diagram illustrating a method for simulating a modification to the position of a hierarchical pin on a path, in accordance with embodiments of the present disclosure.

FIG. 4 illustrates a logic-flow diagram of a method 400 for simulating a modification to the position of a hierarchal pin on a path. In block 402 a net exhibiting a hierarchal pin is selected. In block 404 the hierarchal pin's simulated updated location is selected. In some embodiments the updated location may be simulated at any point on the path, but in this embodiment it is upstream of the hierarchal pin's position in the current processor design. In some embodiments the updated position of the hierarchal pin may be the current position of a different pin on the path, such as a source pin at the exit of an upstream logic macro. This may be beneficial, for example, when simulating the results of moving all integration that is downstream of that logic macro to a faster layer in an attempt to close the path.

In block 406 the layer speed on the faster layer (the layer downstream of the hierarchal pin) is identified. In this embodiment the layer beyond the hierarchal pin is labeled as the "faster layer" because it contains faster wires, but in some embodiments the layer beyond the hierarchal pin may actually be located on a slower layer. In both embodiments in which the layer beyond the hierarchal pin is the faster layer and in which it is the slower layer, the hierarchal pin may be repositioned in such a direction as to either increase or decrease the total path time. In this embodiment, once the layer speed of the faster layer is identified, it may be applied to the portion of the path that is downstream of the hierarchal pin's simulated updated location (excluding portions of the path occupying even faster layers that are past farther downstream hierarchal pins) in block 408. This can be illustrated in an example in which a processor is simulating the relocation of the hierarchal pin to the same location as the source pin, e.g., at the exit of a logic source macro. In this example, the portions of the path that are downstream of that source pin may be treated as if a signal moving through the net on those portions traveled at the layer speed of the faster later. This treatment may be applied to a simulation method similar to method 100 to determine an updated arrival time of a hypothetical signal at a pin downstream of the hierarchal pin's simulated updated location. This updated arrival time may then be used to find an updated time for the entire path.

Figure 5:
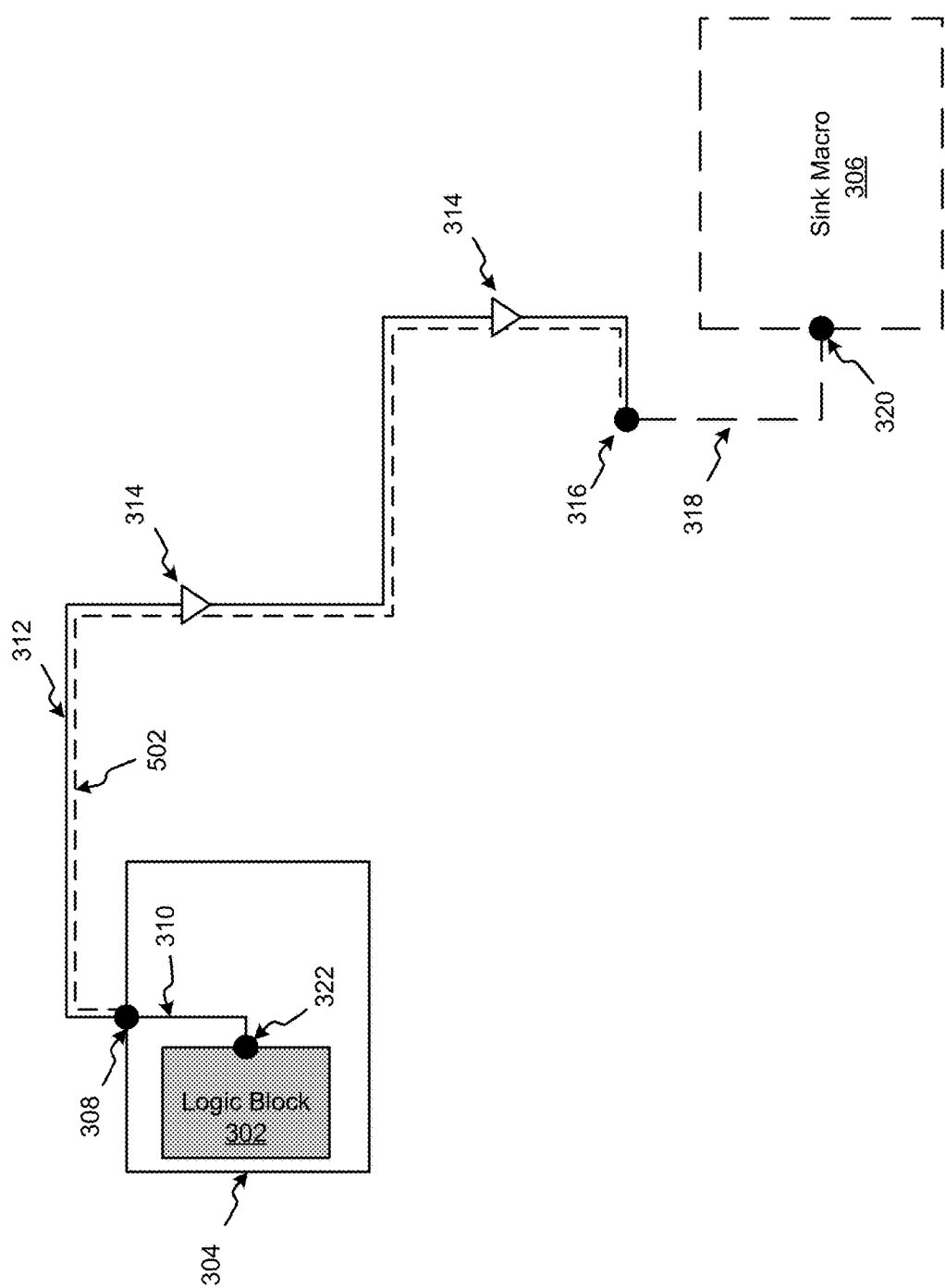
FIG. 5 illustrates a simplified representation microprocessor design for which a modification to the position of a hierarchal pin on a path may be simulated, in accordance with embodiments of the present disclosure.

FIG. 5 provides an example of a path design for which such a modification may be simulated. In FIG. 5 references that are identical to references in FIG. 3 shall refer to the same or similar components unless otherwise noted. For example, Hierarchal Pin 316 may refer in FIG. 5 to a pin to which Integration Wire 312 connects. At this connection point, a signal may be transferred to a faster layer of the microprocessor design, depicted in FIG. 5 as the dashed line that composes Parent Integration Wire 318 between Hierarchal Pin 316 and Sink Macro 306.

In some embodiments, the wire design may be such that the Parent Integration Wire 318 has a different speed than Integration Wire 312. Thus, applying the speed of Parent Integration Wire 318 to a portion of Integration Wire 312 (e.g., starting at either of Repeaters 314 and proceeding downstream to Hierarchal Pin 316) in effect simulates a modification of Hierarchal Pin's 316 location to a corresponding point on Integration Wire 312 (e.g., to the corresponding Repeater 314 in the previous parenthetical example). In this embodiment Parent Integration Wire 318 has a faster speed than Integration Wire 312, but in other embodiments Parent Integration Wire 318 may have a slower speed.

In FIG. 5 this simulation is represented by imposing Simulated Parent Integration Wire 502, shown here as a finely dashed line, along Integration Wire 312. In this embodiment, Simulated Parent Integration Wire 502 is extended completely to Source Pin 308, which would represent a redesign of the integration solution that would relocate Hierarchal Pin 316 to the location of Source Pin 308, effectively replacing Source Pin 308. However, this simulation does not provide the integration design to incorporate the relocation, but instead stipulates the estimated result of the modification for timing purposes.

In some embodiments it may be beneficial to simulate the beginning of Parent Integration Wire 502 at any point along Integration Wire 312 between Source Pin 308 and Hierarchal Pin 316, rather than replacing Source Pin 308. For example, if the designer realized ahead of time that the farthest upstream Hierarchal Pin 316 could be relocated is between the Repeaters 314. In other embodiments, Simulated Parent Integration Wire 502 may be extended past Source Pin 308, into Source Macro 304.

In this embodiment a modification to the position of a hierarchal pin connecting a path to a net on the next-highest layer was simulated. However, in other embodiments it may be beneficial to simulate the relocation of a hierarchal pin that would connect a path to a net that is multiple layers higher than the layer containing Integration Wire 312. Further, in some chip designs the lower layers may contain faster wires than higher layers, in which case this method could be used to simulate using the speed of a lower layer. In related embodiments method 100 may be used to simulate the speed of a wire located on a slower layer. This may be beneficial, for example, if it becomes apparent that an open path is not closable unless it is brought to a faster layer. If that faster layer had no capacity for the open path, and it may be necessary to identify a path on that faster layer that could be moved to a slower layer. This may involve simulating a slower layer speed on the paths on that faster layer to identify a path that would remain closed at the slower layer speed.

In some open paths exhibiting a short rise/fall time at a pin, a design change to decrease the rise/fall time may be sufficient to close the path. In microprocessor design such a decrease may involve several different modifications to the integration solution, such as increasing the drive strength upstream of the pin with the low slew rate by inserting a repeater upstream of the pin, upgrading an existing upstream repeater, or moving the pin closer to an upstream repeater. By stipulating a shorter rise/fall time at a pin, the modification to the integration solution that increases the slew rate (and thus decrease the rise/fall time) to acceptable levels may be simulated before the modifications are designed.

Figure 6:
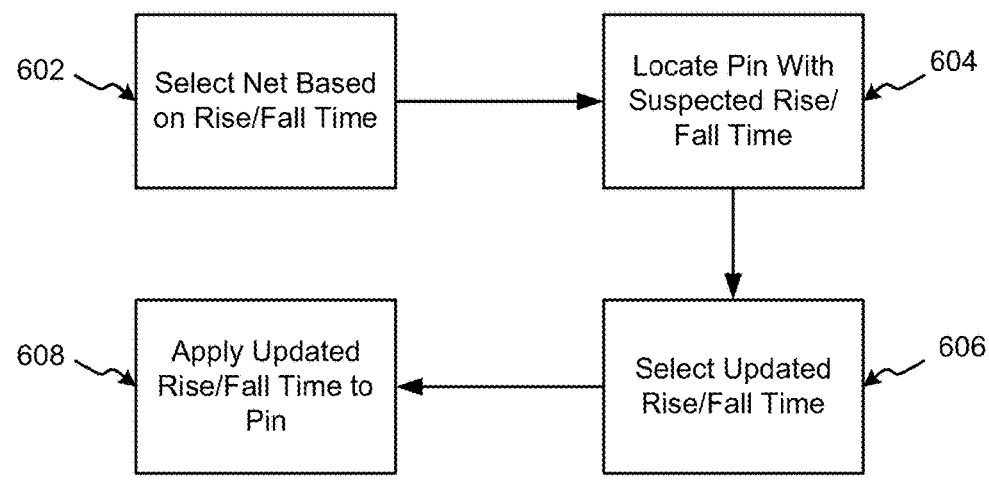
FIG. 6 depicts a logic-flow diagram illustrating a method for simulating a modification to the integration solution to decrease the rise/fall time at a pin, in accordance with embodiments of the present disclosure.

FIG. 6 illustrates a logic-flow diagram of a method for simulating a modification to the integration solution to decrease the rise/fall time at a pin. In block 602, a net on an open path is selected based on the existence of or potential for a long rise/fall time on the net. Once the net is selected, a pin suspected of having a long rise/fall time is located in block 604. In some embodiments this location may refer to Cartesian coordinates, while in others it may refer to the topological location on the path or net. Once the pin is located, an updated rise/fall time is selected for the pin in block 606. In different embodiments this rise/fall time may be selected differently. In some embodiments the selection may take the form of establishing a minimum or set slew rate at that pin. For example, if the voltage change at a pin were 3.3V, the processor may establish a minimum rate of 0.06666V/ps, a set rate of 0.06666V/ps, or 2 percent per picosecond. At these rates, the rise/fall time would be equal to or less than 50 ps. In some other embodiments the selection may take the form of stipulating a maximum amount for the rise/fall time, or "capped" time, and treating any voltage changes that take longer than that capped time as if they occurred within the capped time. Relating to the previous examples, the processor may cap the rise/fall time at 50 ps. In some embodiments these various selections may be made using the very beginning (0 percent) and end (100 percent) of a voltage change as reference points. In other embodiments, other reference points may be used. For example, the processor may require that the increase from 10 percent to 90 percent of the voltage change occur within 50 ps.

In block 608 the updated rise/fall time may be applied to a simulation method similar to method 100 to determine an updated arrival time of a hypothetical signal. Typically this will be determined for the pin in question or a downstream pin. This updated arrival time may then be used to find an updated time for the entire path.

Figure 7:
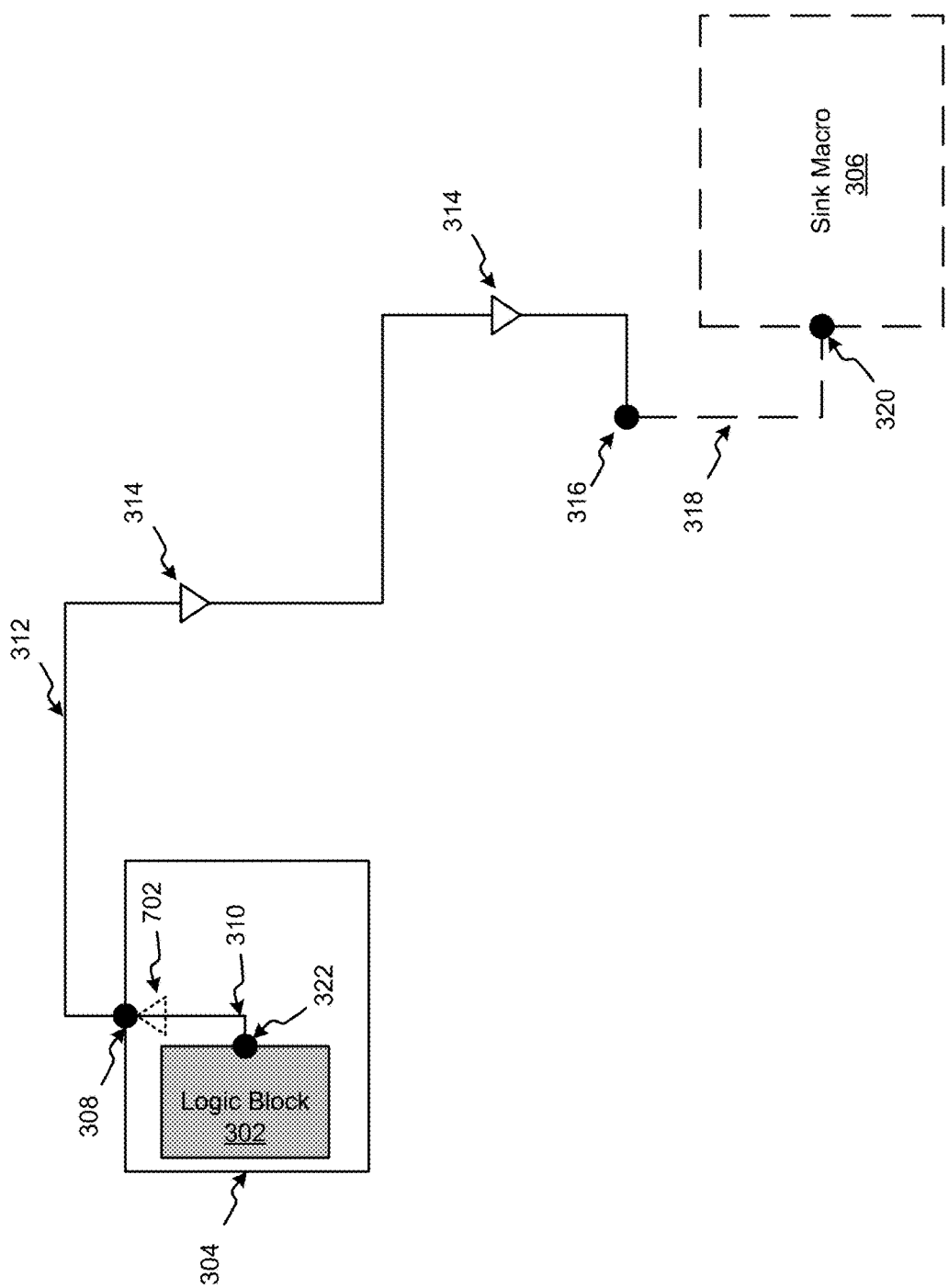
FIG. 7 illustrates a simplified representation microprocessor design for which a modification to the integration solution to decrease the rise/fall time at a pin may be simulated, in accordance with embodiments of the present disclosure.

FIG. 7 provides an example of a path design for which such a modification may be simulated. In FIG. 7 references that are identical to references in FIG. 3 shall refer to the same or similar components unless otherwise noted. For example, Source Pin 308 may refer in FIG. 7 to a pin at which a signal exits Source Macro 304 and begins travelling over Integration Wire 312. If the rise/fall time at Source Pin 308 is long, the signal will not begin travelling over Integration Wire 312 until after a relatively long delay. A design change to decrease the rise/fall time may be simulated by determining what the arrival time at Source Pin 308 (usually identified as the midpoint of the voltage increase) and the arrival time at a downstream pin would have been had the rise/fall time at Source Pin 308 been shorter.

Such a simulated modification is graphically represented in FIG. 7 by Simulated Repeater 702, inserted before Source Pin 308. However, the embodiments of this disclosure do not provide the integration design to incorporate this repeater, but instead stipulates the estimated result of the modification for timing purposes. For example, in some embodiments the particular size of the repeater necessary to create a sufficient drive strength at Source Pin 308 is not determined, nor is the position on Macro Wire 310 to place the repeater. Further, the simulated rise/fall time may be obtained by increasing a repeater already located on Macro Wire 310, or repositioning Source Pin 308 to be closer to such repeater, or any combination of the above methods. This simulation process is not affected by the design modification that may ultimately achieve the simulated decreased rise/fall time. Instead, the process stipulates the estimated timing results of any such design without creating or implementing the design. For example, by querying a processor to calculate the updated arrival times at Source Pin 308 and Hierarchal Pin 316 given a simulated rise/fall time, the simulation method may produce the updated arrival times that would occur if the redesign were performed. These updated arrival times may then be used to determine the updated timing of the entire path.

Figure 8:
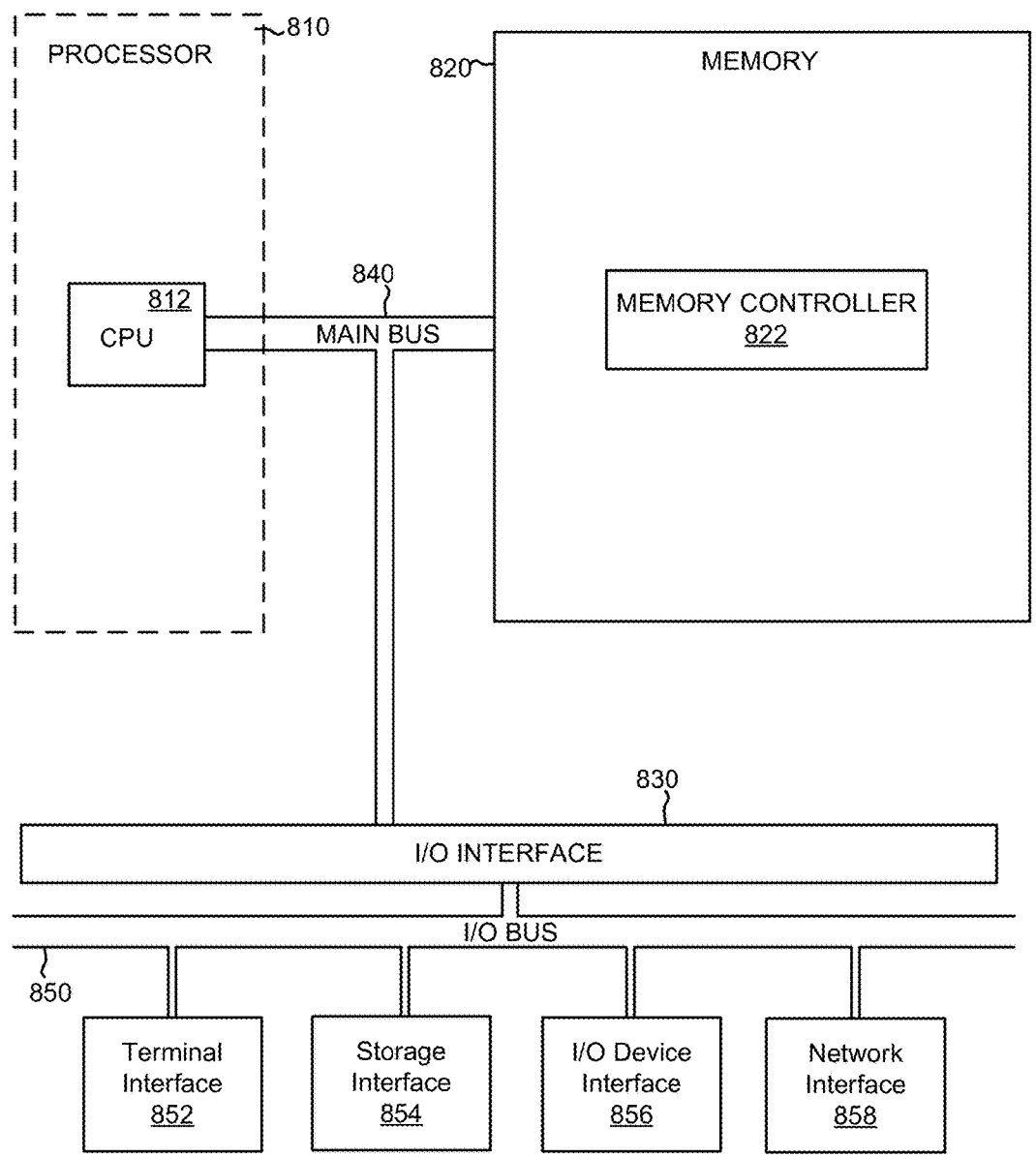
FIG. 8 depicts an embodiment of a representative computer system, in accordance with embodiments of the present disclosure.

FIG. 8 depicts the representative major components of an exemplary Computer System 801 that may be used, in accordance with embodiments of the present disclosure. The particular components depicted are presented for the purpose of example only and are not necessarily the only such variations. The Computer System 801 may comprise a Processor 810, Memory 820, an Input/Output Interface (herein I/O or I/O Interface) 830, and a Main Bus 840. The Main Bus 840 may provide communication pathways for the other components of the Computer System 801. In some embodiments, the Main Bus 840 may connect to other components such as a specialized digital signal processor (not depicted).

The Processor 810 of the Computer System 801 may be comprised of one or more CPUs 812. The Processor 810 may additionally be comprised of one or more memory buffers or caches (not depicted) that provide temporary storage of instructions and data for the CPU 812. The CPU 812 may perform instructions on input provided from the caches or from the Memory 820 and output the result to caches or the Memory 820. The CPU 812 may be comprised of one or more circuits configured to perform one or methods consistent with embodiments of the present disclosure. In some embodiments, the Computer System 801 may contain multiple Processors 810 typical of a relatively large system. In other embodiments, however, the Computer System 801 may be a single processor with a singular CPU 812.

The Memory 820 of the Computer System 801 may be composed of a Memory Controller 822 and one or more memory modules. In some embodiments, the Memory 820 may comprise a random-access semiconductor memory, storage device, or storage medium (either volatile or non-volatile) for storing data and programs. The Memory Controller 822 may communicate with the Processor 810, facilitating storage and retrieval of information in the memory modules. The Memory Controller 822 may communicate with the I/O Interface 830, facilitating storage and retrieval of input or output in the memory modules. In some embodiments, the memory modules may be dual in-line memory modules.

The I/O Interface 830 may comprise an I/O Bus 850, a Terminal Interface 852, a Storage Interface 854, an I/O Device Interface 856, and a Network Interface 858. The I/O Interface 830 may connect the Main Bus 840 to the I/O Bus 850. The I/O Interface 830 may direct instructions and data from the Processor 810 and Memory 820 to the various interfaces of the I/O Bus 850. The I/O Interface 830 may also direct instructions and data from the various interfaces of the I/O Bus 850 to the Processor 810 and Memory 820. The various interfaces may comprise the Terminal Interface 852, the Storage Interface 854, the I/O Device Interface 856, and the Network Interface 858. In some embodiments, the various interfaces may comprise a subset of the aforementioned interfaces (e.g., an embedded computer system in an industrial application may not include the Terminal Interface 852 and the Storage Interface 854).

Logic modules throughout the Computer System 801—including but not limited to the Memory 820, the Processor 810, and the I/O Interface 830—may communicate failures and changes to one or more components to a hypervisor or operating system (not depicted). The hypervisor or the operating system may allocate the various resources available in the Computer System 801 and track the location of data in Memory 820 and of processes assigned to various CPUs 812. In embodiments that combine or rearrange elements, aspects of the logic modules' capabilities may be combined or redistributed. These variations would be apparent to one skilled in the art.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer program product, the computer program product comprising a computer readable storage medium having program instructions embodied therewith, the program instructions executable by a computer to cause the computer to:
   identify an open path in a microprocessor design;
   simulate at least one modification to a design of the open path, wherein simulating the at least one modification comprises accepting as true an updated property of the open path based on an estimated effect that would result from a design of the at least one modification;
   calculate an updated arrival time at a first pin based on the at least one simulated modification;
   calculate an updated path time based on the updated arrival time; and
   determine, based on the updated path time, whether the open path would remain open if the at least one simulated modification were designed into the open path;
   wherein the microprocessor design is modified based on the determination;
   wherein the computer readable storage medium is not transitory per se.

2. The computer program product of claim 1 wherein causing the computer to accept as true an updated property of the open path comprises:
   simulating an integration distance reduction to the open path, comprising:
      identifying a first net on the open path;
      identifying a beginning point of the net and an ending point of the net;
      identifying an integration distance for the net;
      identifying a modified Manhattan Distance between the beginning point and ending point; and
      substituting the modified Manhattan Distance for the integration distance;
   simulating an integration-speed substitution to a second net on the path, comprising:
      identifying the second net on the open path;
      identifying a first layer on which the second net is located;
      identifying an integration speed of a second layer, wherein the integration speed of the second layer is different from an integration speed of the first layer; and
      substituting the integration speed of the second layer for the integration speed of the first layer over the net;
   simulating a decrease to a rise/fall time on a pin, comprising:
      identifying a pin on the path based on the potential of a long rise/fall time at the pin; and
      applying a shorter rise/fall time at the pin.

3. The computer program product of claim 1, wherein the updated property comprises an updated integration distance of a net on the open path.

4. The computer program product of claim 1, wherein the updated property comprises an updated integration speed of a net on the open path.

5. The computer program product of claim 1, wherein the updated property comprises an updated rise/fall time on a pin on the open path.

6. A system comprising one or more computer processor circuits configured to perform a method comprising:
   identifying an open path in a microprocessor design;
   simulating at least one modification to a design of the open path, wherein simulating the at least one modification comprises accepting as true an updated property of the open path based on an estimated effect that would result from a design of the at least one modification;
   calculating an updated arrival time at a first pin based on the at least one simulated modification;
   calculating an updated path time based on the updated arrival time; and
   determining, based on the updated path time, whether the open path would remain open if the at least one simulated modification were designed into the open path;
   wherein the microprocessor design is modified based on the determination.

7. The system of claim 6 wherein accepting as true an updated property of the open path comprises:
   simulating an integration distance reduction to the open path, comprising:
      identifying a net on the open path;

identifying a beginning point of the net and an ending point of the net;
identifying an integration distance for the net;
identifying a modified Manhattan Distance between the beginning point and ending point; and
substituting the modified Manhattan Distance for the integration distance;
simulating an integration-speed substitution to the net on the path, comprising:
identifying a first layer on which the net is located;
identifying an integration speed of a second layer, wherein the integration speed of the second layer is different than an integration speed of the first layer; and
substituting the integration speed of the second layer for the integration speed of the first layer over the net;
simulating a decrease to a rise/fall time on a pin, comprising:
identifying a pin on the path based on the potential of a long rise/fall time at the pin; and
applying a shorter rise/fall time at the pin.

8. The system of claim 6, wherein the updated property comprises an updated integration distance of a net on the open path.

9. The system of claim 6, wherein the updated property comprises an updated integration speed of a net on the open path.

10. The system of claim 6, wherein the updated property comprises an updated rise/fall time on a pin on the open path.

* * * * *